(No Model.)

C. RESS.
TAILOR'S CHALK AND HOLDER.

No. 575,275. Patented Jan. 12, 1897.

WITNESSES:
Jacob P. Brown
Richard J. Elliott

Charles Ress   INVENTOR.

BY
Schreiter & Van Iderstine   ATTORNEYS

UNITED STATES PATENT OFFICE.

CHARLES RESS, OF BROOKLYN, NEW YORK.

TAILOR'S CHALK AND HOLDER.

SPECIFICATION forming part of Letters Patent No. 575,275, dated January 12, 1897.

Application filed April 28, 1896. Serial No. 589,397. (No model.)

*To all whom it may concern:*

Be it known that I, CHARLES RESS, a citizen of the United States, residing in Brooklyn, county of Kings, and State of New York, have invented certain new and useful Improvements in Tailors' Chalk and Holders Therefor, of which the following is a specification.

My invention relates to devices for marking cloth for cutting; and it consists of the hereindescribed composition of a marking substance and of the holder required for it.

My invention is illustrated in the accompanying drawings, wherein—

Figure 1:
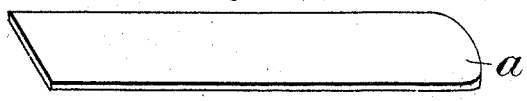
Figure 2:
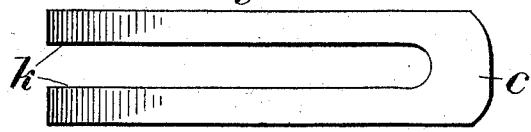
Figure 3:
Figure 4:
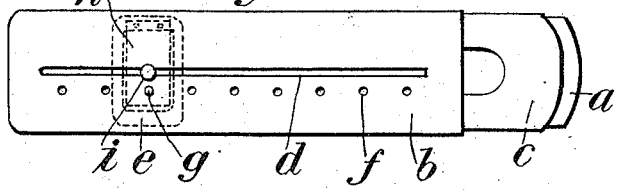
Figure 6:
Figure 7:
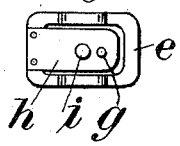
Figure 5:
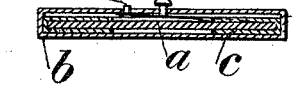

Figure 1 is a perspective view showing a strip of the chalk or marking substance. Fig. 2 is a top view of casing for supporting the thin strip of the chalk and sliding in the holder. Fig. 3 is a side view thereof. Fig. 4 is a top view, and Fig. 5 is a section, of the whole marking device. Fig. 6 is a side view of the setter or carriage. Fig. 7 is a top view thereof.

Similar letters of reference indicate corresponding parts in all of the views.

The marking substance I call "chalk," in accordance with the usage prevailing in the trade, is composed of paraffin, mineral wax, beeswax, and of some coloring-matter, clay or ocher, all melted together and thoroughly mixed. In preparing this substance I melt paraffin (about four parts) and add to it one part of mineral wax and a small quantity, from one-sixth to one-half parts, of beeswax. The quantity of beeswax governs the grade of the chalk. The more of it is added the softer will be the chalk. I use, therefore, more of it with harder coloring material and less with soft. The mixture is kept heated till all its ingredients are thoroughly assimilated, and while yet hot and thinly flowing about the same quantity of coloring-matter (clay or ocher of any desired color) in a finely-divided state is mixed therewith. The yet liquid paste is then poured into steel molds and allowed to cool. In the mold the chalk is formed into thin flat strips ready for use by tailors without sharpening, whereby all the considerable quantities of the chalk otherwise wasted are saved.

My improved chalk is generally quite brittle and could not be used in this shape without some protective casing. I therefore provide the metallic sheath or casing $c$ for covering the slender strip $a$. This casing is made of a folded strip of sheet metal fully closed around the chalk $a$ at its upper end by bending up the edges and soldering them to the strips $k$. Lower down, however, the strips $k$ are cut from the edges (respectively not soldered to it) and bent upward. These strips $k$ act as springs, sustaining by friction casing $c$ within the holder $b$ and at the same time opening the rear end of the casing $c$ to admit setter $e$.

Holder $b$ is a suitably long, rectangular, and almost flat box open at one end and preferably made of sheet metal. In the center of one of its flat sides is made a long narrow slot $d$, through which button $i$ of the setter or carriage $e$ projects. Along this slot $d$ is made a series of holes $f$, set at short equal distances from each other and adapted to receive the locking-pin $g$, set in the spring $h$, secured to the carriage $e$.

Setter or carriage $e$ consists of a flat rectangular frame reduced in height on its shorter sides to fit in casing $c$, between strips $k$. A flat spring $h$, riveted to one of the shorter sides of the frame, is provided with knob $i$, projecting through slot $d$ of the holder $b$, and with locking-pin $g$, adapted to enter the holes $f$, thereby locking the setter $e$ in desired position. The setter is moved in the case (and in the holder) by pressing on the knob $i$, thus pushing the spring $h$ down and withdrawing the pin $g$ from the hole, wherein it sticks at the time, (thus first unlocking it,) and then the setter may be pushed in either direction. The rear or inner end of the strip of the chalk rests against the setter or carriage $e$, the setter pushing it forward and feeding it from the casing, and it also sustains it in position while it is being used. The relative position of the casing $c$ in the holder and of the chalk in casing $c$ may be so adjusted that only a narrow edge of the chalk will project therefrom, the rest of the strip being efficiently protected in the casing slid within the holder.

I claim as my invention and desire to secure by Letters Patent—

1. A tailor's marking substance, compounded of four parts of paraffin, one part of mineral wax, and from one-sixth to one-half parts of beeswax, and of some coloring-matter, as clay or ocher all these components being melted together and thoroughly mixed and the compound cast in strips suitable for use.

2. In a device for marking of cloth for cutting, the combination with a thin strip of a marking substance, of a protective tubular casing, closed around one end of the strip, and split and slotted on the other end, the casing being adapted to be inserted in a correspondingly-shaped tubular holder, and the split sides of the casing acting as springs and sustaining the casing in the holder by friction.

3. In a device for marking of cloth for cutting, the combination with a tubular holder, for a thin strip of a marking substance, inclosed in a tubular casing, provided with a longitudinal slot and with holes adapted to receive a locking-pin, arranged equidistantly along one edge of the slot, of a setter, comprising a flat frame, fitted into the holder and the casing, a spring, riveted to the frame, a knob, secured to the spring and projecting through a slot in the holder, and a locking-pin secured to the spring and adapted to lock the setter in adjusted position.

In witness that I claim the improvements described in the foregoing specification I have signed my name in the presence of two subscribing witnesses.

CHARLES RESS.

Witnesses:
RICHARD I. ELLIOTT,
E. C. NIELSON.